Aug. 4, 1942. T. O. LILLQUIST 2,292,277
LOCOMOTIVE HEADLIGHT CONTROL SYSTEM
Filed Jan. 23, 1942
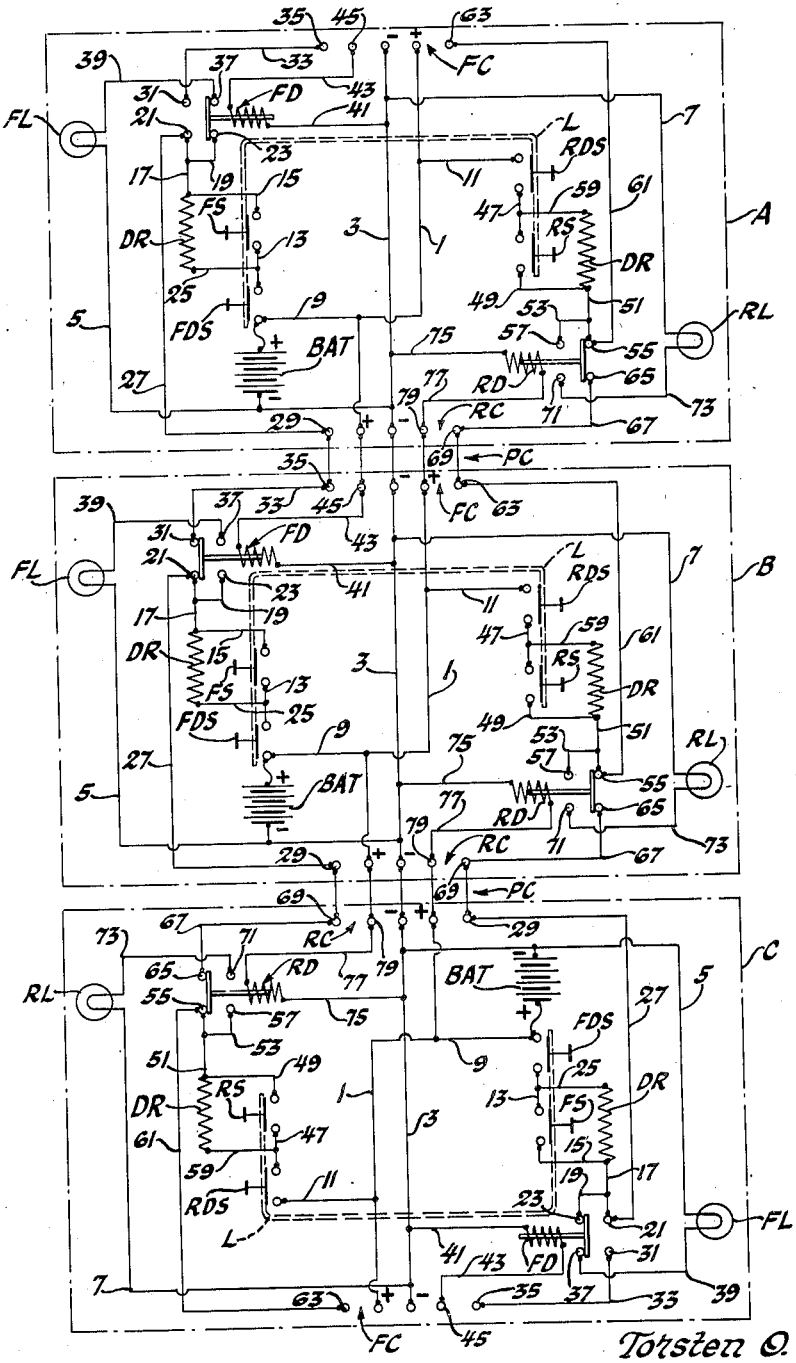
Inventor
Torsten O. Lillquist
By
Blackmore, Spencer & Hind
Attorneys Patented Aug. 4, 1942

2,292,277

UNITED STATES PATENT OFFICE 2,292,277

LOCOMOTIVE HEADLIGHT CONTROL SYSTEM

Torsten O. Lillquist, Clarendon Hills, Ill., assignor to General Motors Corporation, Detroit, Mich., a corporation of Delaware Application January 23, 1942, Serial No. 427,927

3 Claims. (Cl. 171—97)

The present invention relates generally to locomotive headlight systems and more particularly to a system which may readily be operated in multiple with other systems of the same type.

The object of the present invention is to provide a locomotive headlight system comprising headlights, one on each end, control means therefor, individual headlight isolation means, and means for interconnecting the system in either end-to-end relation with systems of the same type on other locomotive units to permit only the headlights on opposite ends of the interconnected locomotive units to be conveniently controlled jointly or individually by any control means on any unit so that the current supply for each headlight at opposite ends of the interconnected units is provided by the power source on the locomotive on which the control switches are operated.

The means for accomplishing the above object will be better understood by referring to the following detailed description and the single page of drawings showing diagrammatically a plurality of locomotive units, each having a separate headlight system of identical type which includes electrical connecting means for interconnecting the systems in either to-to-end relation when the locomotives are mechanically coupled together for multiple operation.

Referring to the drawing, a plurality of locomotive units are shown generally at A, B and C. All of the headlight systems on each locomotive unit are identical and include front and rear headlights FL and RL, front and rear headlight switches FS and RS, front and rear headlight dimming switches FDS and RDS, a dimming resistor DR, front and rear headlight isolation and disconnecting means or relays FD and RD, a battery BAT, and front and rear electrical connecting means comprising multiple contact plug receptacles shown generally at FC and RC. It has been found that with the headlight system shown it is desirable to provide any well known type of locking means to lock the front and rear headlight control and dimming switches in the open position when the system is interconnected with other systems and controlled in multiple from the switches on another locomotive unit. The locking means is shown diagrammatically at L and may, for example, comprise a bar which can be moved by a removable key, not shown, to lock all the switches on each unit in the open position, as shown. The key may be engaged with the locking means of the switches on one unit in any well known manner to move the locking means to the unlocked position in order that these switches may then be moved manually to the closed position.

The front and rear plug receptacles FC and RC are of conventional type and include five contacts spaced so that plugs having similarly spaced contacts may be inserted therein, in one position only, to properly interconnect the systems by suitable flexible connections extending between similar plug contacts shown diagrammatically at PC and to be referred to in detail subsequently.

The front and rear headlight isolation and disconnecting means or relays FD and RD include, as shown, two pairs of fixed contacts, an armature contact normally retained in bridging contact with one pair of fixed contacts and an actuating winding which, when energized, causes the armature to move out of normal bridging contact with the pair of fixed contacts shown bridged and into bridging contact with the other pair of fixed contacts.

The electrical connections interconnecting the elements of each locomotive unit headlight control system are identical and will now be described in detail. As shown on the drawing, positive and negative train line conductors 1 and 3, respectively, are shown extending between the positive and negative contacts of the front and rear plug receptacles FC and RC indicated by plus and minus signs. Conductors 5 and 7 are shown connected between one terminal of each headlight and the negative train line conductor 3, the negative battery terminal being connected directly to the conductor 5. The positive battery terminal is shown directly connected to one contact of the forward headlight dimming switch FDS and this contact is also shown connected by a conductor 9 to the positive control conductor 1. One contact of the rear headlight dimming switch RDS is also shown connected to the positive train line conductor 1 by a conductor 11. The other contact of the forward dimming switch FDS is connected by a conductor 13 to one contact of the forward switch FS, the other contact of which is connected by conductors 15, 17 and 19 to one terminal of a dimming resistor DR and also to the fixed contacts 21 and 23 of the relay FD. The other terminal of the resistor is connected to conductor 13 by a conductor 25 so that the resistor may be shunted upon closure of the switch FS. The fixed relay contact 21 is also connected by a conductor 27 to a contact 29 of the rear plug receptacle RC. The fixed relay contact 31 is connected by a conductor 33 to a contact 35 of the front receptacle FC and the fixed relay contact 37 is connected by a conductor 39 to the other terminal of the front headlight FL. One terminal of the winding of the relay FD is connected by a conductor 41 to the negative control conductor 3, and the other relay winding terminal is connected by a conductor 43 with a contact 45 of the front receptacle FC.

The connections between the train line conductors and the rear headlight RL and control means therefor are similar to those described above. The other terminal of the rear dimming switch RDS is connected by a conductor 47 to one terminal of the switch RS, the other terminal of which is connected by conductors 49, 51 and 53 to one terminal of a dimming resistor DR and fixed contacts 55 and 57 of the relay RD. The other dimming resistor terminal is connected by a conductor 59 to the conductor 47. The fixed contact 55 is also connected by a conductor 61 to a contact 63 of the front plug receptacle FC. The fixed contact 65 of the relay RD is connected by a conductor 67 to a fixed contact 69 of the rear receptacle RC, and the fixed relay contact 71 is connected by a conductor 73 to the other terminal of the rear headlights RL. One terminal of the winding of the relay RD is connected to the negative train line conductor 3 by a conductor 75, and the other winding terminal is connected by a conductor 77 to a contact 79 of the rear plug receptacle RC.

Single unit control

Control of either the front or rear headlight or both on a single locomotive provided with the above described headlight system is accomplished as follows:

With both the front and rear switches locked in the open position, as shown, it is necessary, as previously described, to move the locking means L to unlock the switches to allow them to be manually closed. If it is assumed that the forward headlight FL is to be brightly illuminated for forward movement of the locomotive both of the front switches FDS and RS are closed. When the switch RS is closed the dimming resistor DR connected directly across this switch is shunted, and upon closure of the switch FDS the headlight will be connected directly across the battery by the following connections:

The connections from the positive to the negative battery terminal are, respectively, the conductors 13, 15, 17 and 19, the armature of relay FD normally bridging the fixed relay contacts 23 and 37, and conductors 39 and 5. If it is desired that the rear headlight RL be illuminated dimly only the rear headlight dimming switch is closed and the rear headlight will be connected across the battery through the following connections: conductors 9, 1, 11, 47 and 59, dimming resistor DR, conductors 51 and 53, armature contact of the relay RD normally bridging the fixed relay contacts 57 and 71, and conductors 73, 7 and the negative train line conductor 3. It will be evident that closure of the switches FDS and FDR only permits both headlights to be dimly illuminated, and closure of both of these switches and also closure of both of the switches FS and RS will cause both headlights to be brightly illuminated as these latter switches then shunt out both of the dimming resistors.

Multiple unit control

When it is desired to operate a number of the above described headlight systems in multiple suitable plug connections, referred to previously and indicated generally at PC, are inserted in the plug receptacles on adjacent ends of the coupled locomotive units A, B and C when they are mechanically coupled together by the conventional coupling devices. As mentioned previously, these plug connections comprise two five contact plugs with five suitable flexible conductors, each of which is connected between like plug contacts which are spaced to enter and make electrical contact with separate contacts of the plug receptacles FC and RC as shown in the drawing.

It will be noted on the drawing that the locomotive unit C and its headlight system therefor is shown connected in reverse end-to-end relation with respect to the locomotive units A and B. The conventional mechanical coupling devices and plug receptacles FC and RC located on opposite ends of each locomotive unit and the plug connections PC shown interconnecting the plug receptacles on adjacent ends of the vehicles accordingly permit the locomotive units to be connected both electrically and mechanically in either end-to-end relation, which will now be described in detail, in order that the headlights on adjacent ends of the units will be disconnected by their respective isolation and disconnecting means or relays RD and FD and allow only the headlights on opposite ends of the interconnected locomotive units to be controlled by the control switches located on any locomotive unit desired.

With the switches on each of the locomotive headlight systems locked in the open position, as shown, when the plug connectors PC are inserted in the plug receptacles FC and RC on adjacent ends of the mechanically coupled units the isolation and disconnecting means or relays FD and RD for the headlights FL and RL adjacent the interconnected ends will be energized, and these headlights will be rendered inoperative by being disconnected or isolated from the interconnected headlight systems. It will be observed that one terminal of each of the relay windings is connected to the negative train line conductor 3 on each locomotive unit and these train line conductors are interconnected with a flexible conductor of the plug connections PC when the plugs are inserted in the plug receptacles FC and RC on adjacent ends of the units, as shown. The positive train line conductors 1 on each locomotive unit are also interconnected with the opposite terminals of the windings of the relays to energize these windings and cause the armatures thereof to move out of normal bridging engagement with one pair of contacts and into bridging engagement with the other pair of relay contacts. The relay windings which are thus energized cause movement of their armatures, which causes the headlights adjacent the electrically and mechanically interconnected ends of the locomotive units to be isolated or disconnected from the interconnected headlight systems.

For example, the winding of the relay RD on locomotive unit A is energized from the battery of unit B through the following conductors: train line conductor 1 on unit B which is connected by a flexible conductor of the plug connection PC with the receptacle contact 79 of unit A and through conductor 77 to one winding terminal of the relay RD on the locomotive unit A, the other terminal being connected to the negative train line conductor by conductor 75. The winding of the relay RD on the locomotive unit C is likewise energized from the battery of the unit B through the same numbered conductors as mentioned above on the B and C locomotive units. The armatures of relays RD on both the A and C locomotive units will accordingly be attracted and moved into bridging relation with the fixed relay contacts 55 and 65 of these relays, which disconnects one terminal of each of the headlights RL on the locomotive units A and C to isolate and disconnect these headlights from the circuit.

The winding of relay FD of locomotive unit B is also energized from the battery of unit A through the following conductors: train line conductor 1 of unit A, which is shown connected to receptacle contact 45 of unit B and conductor 43 connected between this contact and one terminal of the winding of relay FD of unit B, having the opposite terminal connected to the negative train line conductor 3 by the conductor 41.

The winding of relay RD of locomotive unit B is energized from the battery of unit C through the following conductors: train line conductor 1 of unit C shown connected to contact 79 of unit B, which is connected to one winding terminal by conductor 77, the other terminal being connected to the negative train line conductor 3 by the conductor 75.

Energization of the windings of relays FD and RD of locomotive unit B causes movement of the armatures of these relays from the normal position shown. The armature of relay FD is therefore moved into bridging engagement with the fixed relay contacts 21 and 31, and the armature of relay RD is therefore moved into bridging engagement with the fixed relay contacts 55 and 65 to disconnect and isolate the front and rear headlights FL and RL of locomotive unit B from the interconnected headlight systems of the A, B and C units, leaving only the headlights at either end of the interconnected units, namely, the headlights FD on the A and C units, connected in the systems.

Either of the headlights FD on the A or C units at the ends of the interconnected locomotive units may then be controlled by closure of the switches on any unit by first moving the locking means L to the unlocked position.

Assuming that the operator desires to control the end headlights from the B or central unit, he unlocks the locking means L on this unit and closes the switch RDS. The circuit established by closure of this switch is as follows: from the positive terminal of the battery on the B unit, conductors 1, 11, bridged contacts of the switch RDS, conductor 59, dimming resistor RD, conductor 51, bridged contacts 55 and 65 of relay RD, conductor 67, and the contact 69 of the plug receptacle RC of the B unit. This plug contact is interconnected by a flexible conductor and plug contacts with the contact 29 of the rear receptacle RC of the locomotive unit C, and the following connections are made on this unit: conductor 27, connected with contact 29, conductors 17 and 19, contacts 23 and 37, which are normally bridged, as shown, by the armature of relay FD, conductor 39, headlight FL and conductor 5 to negative train line conductor 1 of unit C, which, as has been explained, is interconnected with the negative train line conductor 3 of unit B which is also connected to the negative battery terminal of the unit B.

The above described circuit includes the dimming resistance DR of unit B and hence the headlight FL of unit C will be dimly illuminated. If it is desired that this headlight be illuminated brightly the switch RS of unit B is closed to shunt the dimming resistor DR of unit B out of the circuit.

To cause the headlight FL on the unit A to be dimly illuminated the switch FDS on the unit B is closed to complete the following circuit to this headlight through the following conductors on the unit B from the positive battery terminal: bridged contacts of the switch FDS, conductor 13, dimming resistor DR, conductor 17, bridged contacts 21 and 31 of relay FD, conductor 33 and contact 35 of plug receptacle FC which is connected by plug contacts, and a flexible conductor of the plug connection PC with conductors on the unit A, namely, contact 29 of receptacle RC, conductors 27, 17, 19, normally bridged contacts 23 and 37 of relay FD, conductor 39, headlight FL, conductor 5 to the negative train line control conductor 3, which, as previously described, is connected to the negative train line conductor of unit B. The headlight FL of unit A will be dimly illuminated upon completion of this circuit and if it is desired to illuminate it brightly the switch FS on unit B is closed to shunt out the dimming resistor on this unit.

From the above description of the headlight systems on each locomotive unit and the means for interconnecting the systems and units in either end-to-end relation to retain only the headlights at the ends of the interconnected units and disconnecting all those headlights and the adjacent ends of the units, it will be evident that the end headlights may be controlled in a like manner by operation of the switches on any unit retaining the switches on the other units locked in the open position as shown.

It will be apparent that the headlights on either end of any locomotive unit may conveniently be controlled by the switches on the unit when the unit is operated singly and that the end headlights on a plurality of interconnected units each having identical headlight systems may likewise conveniently be controlled from any unit desired, the headlight disconnecting and isolation means included in each headlight system rendering inoperative the headlights not necessary or those headlights on adjacent ends of the interconnected units.

I claim:

1. In a multi-unit vehicle, each unit having a headlight and a multi-contact receptacle at each end, power conductors extending between separate contacts of the receptacles, a source of power connected between power conductors and a control circuit for each headlight connected across the power conductors, each control circuit including switching means, a control connection between each receptacle and the switching means, power means for operating a portion of said switching means and manual means for operating the remaining portion thereof, the portion of the switching means when operated by the power means causing the headlight to be disconnected therefrom and causing the receptacles to be connected thereto, and means for connecting the power means between one power conductor and one contact of the receptacle adjacent one head-light and multi-conductor connectors for connecting the receptacles on adjacent ends of the units so that power is supplied to the power means operating the switching means for disconnecting the headlights on adjacent ends of the units and for permitting control of either headlight on remote ends of the interconnected units by one of the manually operable means on any unit.

2. In a multi-unit vehicle, each unit having a headlight and a multi-contact connector on each end, a power source, power conductors extending between separate contacts of the connectors and each side of the power source, a separate circuit from the power conductors for each headlight including a manually operable switch and a switching means having a common connection with the manually operable switch and with a contact of one end connector and also having separate connections to a contact of the other end connector and the headlight adjacent thereto, the switching means being normally positioned to connect the headlight in series with the manually operable switch and movable to disconnect the headlight therefrom and complete a connection between both end connectors and the manually operable switch, power actuating means for the switching means, said power actuating means being connected between one power conductor and a contact of the connector adjacent the headlight, and means for interconnecting the connectors on adjacent ends of the units to energize only the power actuated means for moving the switching means to disconnect the headlights on adjacent ends of the units and to connect the headlights on opposite ends of the interconnected units to a separate manually operable switch on each unit for control thereby.

3. In a multi-unit vehicle, each unit having a headlight and a multi-contact connector on each end, a battery, battery conductors extending between separate contacts of the connectors, a control circuit from the battery conductors to each headlight, each circuit including switching means for controlling the headlight, power means for operating a portion of said switching means, manual means for operating the remaining portion of the switching means, a headlight dimming resistor included in the manually operable portion of the switching means, conductors connecting the switching means to the headlight and separate contacts of each connector, the power means being connected between one battery conductor and a contact of the connector adjacent a headlight through which the power means may be energized to cause movement of a portion of the switching means to disconnect the headlight therefrom and connect the conductors extending to the connectors thereto, and multi-conductor connectors having multi-contact plugs insertable in one position into the receptacles on adjacent ends of the units to connect the power means connected to the interconnected receptacles to cause the headlights on adjacent ends of the vehicles to be disconnected and permit control of each of the headlights on the extreme ends of the units by one of the manually operable portions of the switching means on any unit.

TORSTEN O. LILLQUIST.